(12) United States Patent  
Kogo et al.

(10) Patent No.: US 7,395,660 B2  
(45) Date of Patent: Jul. 8, 2008

(54) EXHAUST GAS PURIFICATION SYSTEM FOR AN INTERNAL COMBUSTION ENGINE

(75) Inventors: Tomoyuki Kogo, Susono (JP); Takeshi Hashizume, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 11/579,082

(22) PCT Filed: Jan. 13, 2006

(86) PCT No.: PCT/JP2006/300778

§ 371 (c)(1),
(2), (4) Date: Oct. 30, 2006

(87) PCT Pub. No.: WO2006/075787

PCT Pub. Date: Jul. 20, 2006

(65) Prior Publication Data

US 2008/0016855 A1    Jan. 24, 2008

(30) Foreign Application Priority Data

Jan. 13, 2005    (JP)    .............................. 2005-006487

(51) Int. Cl.
*F01N 3/00*    (2006.01)

(52) U.S. Cl. .............................. 60/295; 60/276; 60/285; 60/286; 60/292; 60/297; 60/299; 60/324

(58) Field of Classification Search .................... 60/276, 60/285, 286, 291, 292, 295, 297, 299, 301, 60/303, 324

See application file for complete search history.

(56) References Cited

U.S. PATENT DOCUMENTS 6,644,022 B2 *    11/2003    Hirota et al.    ................... 60/297

(Continued)

FOREIGN PATENT DOCUMENTS

JP    U 3-104138    10/1991

(Continued)

*Primary Examiner*—Binh Q Tran
(74) *Attorney, Agent, or Firm*—Oliff & Berridge, PLC

(57) ABSTRACT

The present invention has for its problem to be solved to provide a technique in which in an exhaust gas purification system for an internal combustion engine with a filter being arranged on an exhaust passage for trapping PM in an exhaust gas, it is possible to suppress an excessive rise in temperature of the filter during execution of filter regeneration control more preferably. In the present invention, when the amount of intake air in the internal combustion engine decreases up to an amount at which an excessive rise in temperature of the filter might be induced during the execution of filter regeneration control, the oxygen concentration of an ambient atmosphere around the filter is decreased up to a target oxygen concentration. At this time, when the amount of intake air being decreased is more than a certain amount, the oxygen concentration of the ambient atmosphere around the filter is lowered mainly by supplying a reducing agent to a catalyst that is arranged at a location upstream of the filter or supported on the filter (S106). On the other hand, when the amount of intake air being decreased is equal to or less than the certain amount, the oxygen concentration of the ambient atmosphere around the filter is lowered mainly by performing exhaust gas throttling by means of an exhaust gas throttle valve (S104).

2 Claims, 3 Drawing Sheets

U.S. PATENT DOCUMENTS

| | | |
|---|---|---|
| 6,668,548 B1 | 12/2003 | Asanuma et al. |
| 6,817,174 B1 * | 11/2004 | Igarashi et al. ................. 60/295 |
| 6,966,179 B2 * | 11/2005 | Onodera et al. ............... 60/295 |
| 7,246,485 B2 * | 7/2007 | Ohki et al. .................... 60/285 |
| 7,313,913 B2 * | 1/2008 | Okugawa et al. .............. 60/295 |

FOREIGN PATENT DOCUMENTS

| | | |
|---|---|---|
| JP | A 2001-152925 | 6/2001 |
| JP | A 2002-188493 | 7/2002 |
| JP | A 2002-242732 | 8/2002 |
| JP | A 2003-027990 | 1/2003 |
| JP | A 2003-106142 | 4/2003 |
| JP | A 2003-172124 | 6/2003 |
| JP | A 2003-214152 | 7/2003 |
| JP | A 2004-353529 | 12/2004 |

* cited by examiner

EXHAUST GAS PURIFICATION SYSTEM FOR AN INTERNAL COMBUSTION ENGINE

TECHNICAL FIELD

The present invention relates to an exhaust gas purification system for an internal combustion engine which is provided with a particulate filter arranged on an exhaust passage of the internal combustion engine for trapping particulate matter in an exhaust gas.

BACKGROUND ART

In an exhaust gas purification system for an internal combustion engine having a particulate filter (hereinafter referred to as a filter) arranged on an exhaust passage of the internal combustion engine for trapping particulate matter (hereinafter referred to as PM) in an exhaust gas, filter regeneration control for oxidizing PM deposited or accumulated in the filter for removal thereof is carried out by raising the temperature of the filter to a target temperature.

In addition, in Japanese patent application laid-open No. 2003-27990, there is disclosed a technique in which when the operating state of an internal combustion engine becomes a low-load, low-speed rotational operation during the execution of filter regeneration control, the amount of an EGR gas is increased, and at the same time, the amount of intake air is decreased and an amount of fuel corresponding to the amount of oxygen, which will become surplus or excessive after injection of main fuel, is injected as auxiliary fuel injection.

Further, Japanese patent application laid-open No. 2003-172124 discloses a technique in which the amount of auxiliary fuel to be injected is increased when the operating state of an internal combustion engine becomes idle during the execution of filter regeneration control more than in a normal or ordinary operating state thereof. Additionally, techniques related to filter regeneration control are also disclosed in Japanese patent application laid-open No. 2002-188493 and Japanese utility model application laid-open No. H03-104138, respectively.

DISCLOSURE OF THE INVENTION

The temperature of a filter is raised up to a target temperature during the execution of filter regeneration control. When the amount of intake air is decreased due to a change in the operating state of the internal combustion engine during the filter regeneration control, the flow rate of an exhaust gas flowing into the filter (hereinafter referred to as an amount of incoming exhaust gas) also decreases, so the amount of heat taken away from the filter by the exhaust gas (hereinafter referred to as the amount of heat being taken away) will decrease. As a result, there is fear that the temperature of the filter might rise excessively.

Accordingly, the present invention has an object to provide a technique in which in an exhaust gas purification system for an internal combustion engine with a filter being arranged on an exhaust passage for trapping PM in an exhaust gas, it is possible to suppress an excessive rise in temperature of the filter during execution of filter regeneration control more preferably.

According to the present invention, when the amount of intake air in the internal combustion engine decreases up to an amount at which an excessive rise in temperature of the filter might be induced during the execution of filter regeneration control, the oxygen concentration of an ambient atmosphere around the filter (hereinafter referred to simply as a filter oxygen concentration) is decreased up to a target oxygen concentration. At this time, when the amount of intake air being decreased is more than a certain amount, the filter oxygen concentration is lowered mainly by supplying a reducing agent to a catalyst that is arranged at a location upstream of the filter or supported by the filter. On the other hand, when the amount of intake air being decreased is equal to or less than the certain amount, the filter oxygen concentration is lowered mainly by performing exhaust gas throttling by means of an exhaust gas throttle valve.

More specifically, an exhaust gas purification system for an internal combustion engine according to the present invention comprises:

a particulate filter that is arranged on an exhaust passage of said internal combustion engine for trapping particulate matter in an exhaust gas; a catalyst having an oxidation function that is arranged on said exhaust passage at a location upstream of said particulate filter or supported by said particulate filter;

a reducing agent supplying means for supplying a reducing agent to said catalyst;

an exhaust gas throttle valve that is arranged on said exhaust passage;

a filter regeneration control execution means that executes filter regeneration control for oxidizing and removing particulate matter deposited in said particulate filter by raising the temperature of said particulate filter to a target temperature; and an oxygen concentration decreasing means that decreases the oxygen concentration of an ambient atmosphere around said particulate filter:

wherein when the amount of intake air in said internal combustion engine decreases to a value within a range that is less than or equal to a first specified amount of intake air and greater than a second specified amount of intake air during the execution of filter regeneration control by said filter regeneration control execution means, said oxygen concentration decreasing means decreases the oxygen concentration of the ambient atmosphere around said particulate filter to a target oxygen concentration by supplying an upper limit amount of reducing agent, which can be supplied within a range where the temperature of said particulate filter does not exceed a specified temperature, to said catalyst by said reducing agent supply means, and at the same time by throttling the flow rate of the exhaust gas by means of said exhaust gas throttle valve;

whereas when the amount of intake air in said internal combustion engine decreases to a value less than or equal to said second specified amount of intake air during the execution of filter regeneration control by said filter regeneration control execution means, said oxygen concentration decreasing means decreases the oxygen concentration of the ambient atmosphere around said particulate filter to said target oxygen concentration by throttling the flow rate of the exhaust gas to a lower limit of the flow rate, which can be throttled within a range where the pressure in said exhaust passage upstream of said exhaust gas throttle valve does not exceed a specified pressure, by means of said exhaust gas throttle valve, and at the same time by supplying the reducing agent to said catalyst by means of said reducing agent supply means.

Here, note that the target temperature is a temperature at which the PM deposited in the filter can be removed by oxidation, and at which the filter can be suppressed from excessively rising in temperature.

In addition, the first specified amount of intake air may be an amount of intake air in the form of a threshold with which it can be determined that the filter excessively rises in temperature because of a decrease in the amount of heat taken away from the filter according to a decrease in the amount of incoming exhaust gas when the amount of intake air becomes less than or equal to said first specified amount of intake air, and the second specified amount of intake air is an amount that is smaller than said first specified amount of intake air.

In the present invention, when the amount of intake air in the internal combustion engine becomes less than or equal to said first specified amount of intake air during the execution of filter regeneration control, the filter oxygen concentration is decreased to said target oxygen concentration by means of said oxygen concentration decreasing means.

When the filter oxygen concentration is decreased during the execution of filter regeneration control, the oxidation of the PM is suppressed, so the temperature rise of the filter is also suppressed.

Here, note that the target oxygen concentration is an oxygen concentration that can suppress the excessive temperature rise of the filter even when the amount of incoming exhaust gas decreases in accordance with the decreasing amount of intake air. This target oxygen concentration may be a prescribed value, or a value that is determined based on the amount of PM deposited in the filter, the amount of intake air, etc.

In the present invention, when the oxygen concentration is decreased to the target oxygen concentration, the oxygen concentration decreasing means supplies the reducing agent to the catalyst by means of the reducing agent supply means, and at the same time performs so-called exhaust gas throttling in which the flow rate of the exhaust gas is throttled by the exhaust gas throttle valve.

When the reducing agent is supplied to the catalyst, the reducing agent is oxidized in the catalyst, and the oxygen in the exhaust gas is consumed by such oxidation of the reducing agent, so the filter oxygen concentration will be lowered.

In addition, when exhaust gas throttling is executed, the pressure in the exhaust passage upstream of the exhaust gas throttle valve (hereinafter referred to as an upstream side exhaust pressure) rises and hence the load of the internal combustion engine increases. In other words, the amount of fuel to be injected in the internal combustion engine increases. As a result, the oxygen concentration of the exhaust gas exhausted from the internal combustion engine is decreased, so the filter oxygen concentration is accordingly lowered. In addition, when exhaust gas throttling is performed, the amount of oxygen to be supplied to the filter is decreased, so the oxidation of the PM is also suppressed accordingly.

However, when the reducing agent is supplied to the catalyst, the reducing agent is oxidized in the catalyst and thereby the heat of oxidation generates. Thus, when an excessive amount of reducing agent is supplied to the catalyst, the amount of heat generated by the oxidation of the reducing agent excessively increases. As a result, there is fear that the filter might excessively rise in temperature.

On the other hand, when the flow rate of the exhaust gas is excessively throttled by the exhaust gas throttle valve, there is fear that the upstream side exhaust pressure might excessively rise. When the upstream side exhaust pressure excessively rises, an excessive burden is applied to the internal combustion engine, and an excessive influence will be given to the operating state of the internal combustion engine and/or the combustion state of fuel.

In case where the reducing agent is supplied to the catalyst, the filter excessively rises in temperature due to the heat of oxidation generated by the oxidation of the reducing agent more easily when the amount of incoming exhaust gas is relatively small than at other times. In other words, the amount of reducing agent to be supplied to the catalyst is liable to be excessive more easily when the amount of incoming exhaust gas is relatively small than at other times. This is because the smaller the amount of incoming exhaust gas, the smaller becomes the amount of heat taken away thereby, so the temperature of the filter is liable to rise easily.

Also, in case where exhaust gas throttling is carried out by the exhaust gas throttle valve, the upstream side exhaust pressure excessively rises more easily when the amount of incoming exhaust gas is relatively large than at other times. In other words, the flow rate of the exhaust gas is liable to be excessively throttled more easily when the amount of incoming exhaust gas is relatively large. This is because the more the amount of incoming exhaust gas, the larger becomes the flow rate of the exhaust gas upstream of the exhaust gas throttle valve, so the upstream side exhaust pressure is liable to rise easily.

Accordingly, in the present invention, in case where the amount of intake air decreases at the time of execution of filter regeneration control, when the amount of intake air after being decreased is relatively large, i.e., when the amount of incoming exhaust gas is relatively large, the filter oxygen concentration is lowered mainly by supplying the reducing agent to the catalyst, whereas when the amount of intake air after being decreased is relatively small, i.e., when the amount of incoming exhaust gas is relatively small, the filter oxygen concentration is lowered and at the same time the amount of oxygen supplied to the filter is decreased mainly by performing exhaust gas throttling by means of the exhaust gas throttle valve.

Specifically, when the amount of intake air in said internal combustion engine decreases to a value within a range that is less than or equal to a first specified amount of intake air and greater than a second specified amount of intake air at the time of the execution of filter regeneration control, an upper limit amount of the reducing agent, which can be supplied within a range where the temperature of the filter does not exceed a specified temperature, is supplied to the catalyst.

Here, note that the specified temperature is a temperature lower than or equal to an upper limit value of a temperature at which an excessive rise in temperature of the filter can be suppressed even when the filter oxygen concentration is increased due to the amount of intake air exceeding the first specified amount of intake air. This specified temperature may be a value which has been determined in advance through experiments, etc. In other words, according to the above, the filter oxygen concentration is lowered by supplying the reducing agent as much as possible to the catalyst within a range where an excessive rise in temperature of the filter can be suppressed.

Then, the flow rate of the exhaust gas is throttled by means of the exhaust gas throttle valve by an amount necessary to further lower the filter oxygen concentration to a target oxygen concentration when the reducing agent is supplied to the catalyst in this manner.

Thus, even when the filter oxygen concentration is lowered to the target oxygen concentration, the amount of throttling of the flow rate of the exhaust gas by the exhaust gas throttle valve can be decreased as much as possible.

In addition, when the amount of intake air decreases to the second specified amount of intake air or below at the time of the execution of filter regeneration control, the flow rate of the exhaust gas is throttled to a lower limit flow rate, which can be throttled within a range where the upstream side exhaust pressure does not exceed a specified pressure.

Here, note that the specified pressure is lower than a pressure that becomes a threshold with which it can be determined that the upstream side exhaust pressure has excessively risen.

In other words, according to the above-mentioned, the filter oxygen concentration is lowered by throttling the flow rate of the exhaust gas as much as possible within the range where the upstream side exhaust pressure does not excessively rise.

Further, an amount of reducing agent necessary to further lower the filter oxygen concentration to a target oxygen concentration when the flow rate of the exhaust gas is throttled in this manner is supplied to the catalyst.

Thus, even when the filter oxygen concentration is lowered to the target oxygen concentration, the amount of reducing agent supplied to the catalyst can be decreased as much as possible. In addition, in case where the reducing agent is supplied to the catalyst, the filter oxygen concentration does not lower until the oxidation of the reducing agent takes place. Accordingly, throttling the flow rate of the exhaust gas by the exhaust gas throttle valve can lower the filter oxygen concentration more quickly. According to the above-mentioned, the filter oxygen concentration is mainly decreased mainly by exhaust gas throttling, so the filter oxygen concentration can be lowered up to the target oxygen concentration more quickly. In this case, the amount of oxygen supplied to the filter can also be decreased.

As described above, in the present invention, in case where filter regeneration control is executed, when the amount of intake air decreases to the first specified amount of intake air or below, the filter oxygen concentration is lowered to the target oxygen concentration.

In case where the flow rate of exhaust gas when the amount of intake air has thus been decreased is relatively high, the filter oxygen concentration is lowered up to the target oxygen concentration while suppressing the amount of throttling of the flow rate of the exhaust gas by the exhaust gas throttling as much as possible. As a result, it is possible to suppress an excessive rise in temperature of the filter while suppressing an excessive rise in the upstream side exhaust pressure.

In addition, in case where the flow rate of exhaust gas when the amount of intake air has been decreased is relatively low, the filter oxygen concentration is lowered to the target oxygen concentration while suppressing the amount of reducing agent to be supplied to the catalyst as much as possible. Thus, the amount of oxidation heat generated by oxidation of the reducing agent can be suppressed by suppressing the amount of the reducing agent to be supplied to the catalyst. As a result, the excessive rise in temperature of the filter can be further suppressed.

Thus, according to the present invention, it is possible to suppress the excessive rise in temperature of the filter during the execution of filter regeneration control more preferably.

The second specified amount of intake air may be an amount of intake air that becomes a threshold with which a determination can be made that exhaust gas throttling by the exhaust gas throttle valve should be effected preferentially rather than the supply of the reducing agent to the catalyst, in case where the filter oxygen concentration is decreased to the target oxygen concentration so as to suppress the excessive temperature rise of the filter during the execution of filter regeneration control. Even when the second specified amount of intake air is set to such an amount, the second specified amount of intake air can be determined in advance by experiments, etc.

In the present invention, a prediction means may be further comprised. The prediction means predicts, based on the amount of intake air in the internal combustion engine, an amount of incoming exhaust gas upon release of the exhaust gas throttling by the exhaust gas throttle valve during the time when exhaust gas throttling is carried out by the exhaust gas throttle valve. When the amount of incoming exhaust gas predicted by this prediction means increases up to an excessive temperature rise suppressible flow rate which can suppress an excessive temperature rise of the exhaust gas, the exhaust gas throttling by the exhaust gas throttle valve may be released.

When the amount of intake air in the internal combustion engine increases while the filter oxygen concentration is decreased to the target oxygen concentration so as to suppress the excessive temperature rise of the filter during the execution of filter regeneration control, the amount of incoming exhaust gas upon the release of exhaust gas throttling by the exhaust gas throttle valve also increases so that the amount of heat being taken away will increase, too.

However, at this time, when the exhaust gas throttling, which is being carried out by the exhaust gas throttle valve so as to lower the filter oxygen concentration, is released, the filter oxygen concentration rises or increases rapidly, too. As a result, the oxidation of the PM in the filter is rapidly facilitated, whereby the oxidation heat generated by the oxidation of the PM might increase rapidly. Thus, when the exhaust gas throttling by the exhaust gas throttle valve is released at a time point when the amount of incoming exhaust gas begins to increase, the amount of oxidation heat generated by the oxidation of the PM becomes larger than the amount of heat being taken away, as a result of which there is fear that an excessive temperature rise of the filter might be induced.

Accordingly, as stated above, when exhaust gas throttling is performed by the exhaust gas throttle valve, the amount of incoming exhaust gas upon the release of exhaust gas throttling is predicted by the prediction means based on the amount of intake air in said internal combustion engine, and when the amount of incoming exhaust gas predicted by the prediction means has increased up to the excessive temperature rise suppressible flow rate, the exhaust gas throttling by the exhaust gas throttle valve is released.

Here, note that the excessive temperature rise suppressible flow rate is an amount that is larger than or equal to a lower limit value of the amount of incoming exhaust gas at which the amount of heat being taken away becomes larger than the amount of heat generated by the oxidation of the PM. This excessive temperature rise suppressible flow rate can be calculated based on the temperature of the filter and the amount of the deposited PM in the filter.

According to the above-mentioned, it is possible to release the exhaust gas throttling by the exhaust gas throttle valve at timing at which the excessive temperature rise of the filter can be suppressed.

BEST MODE FOR CARRYING OUT THE INVENTION

Hereinafter, preferred embodiments of an exhaust gas purification system for an internal combustion engine according to the present invention will be described in detail while referring to the accompanying drawings.

First Embodiment

Figure 1:
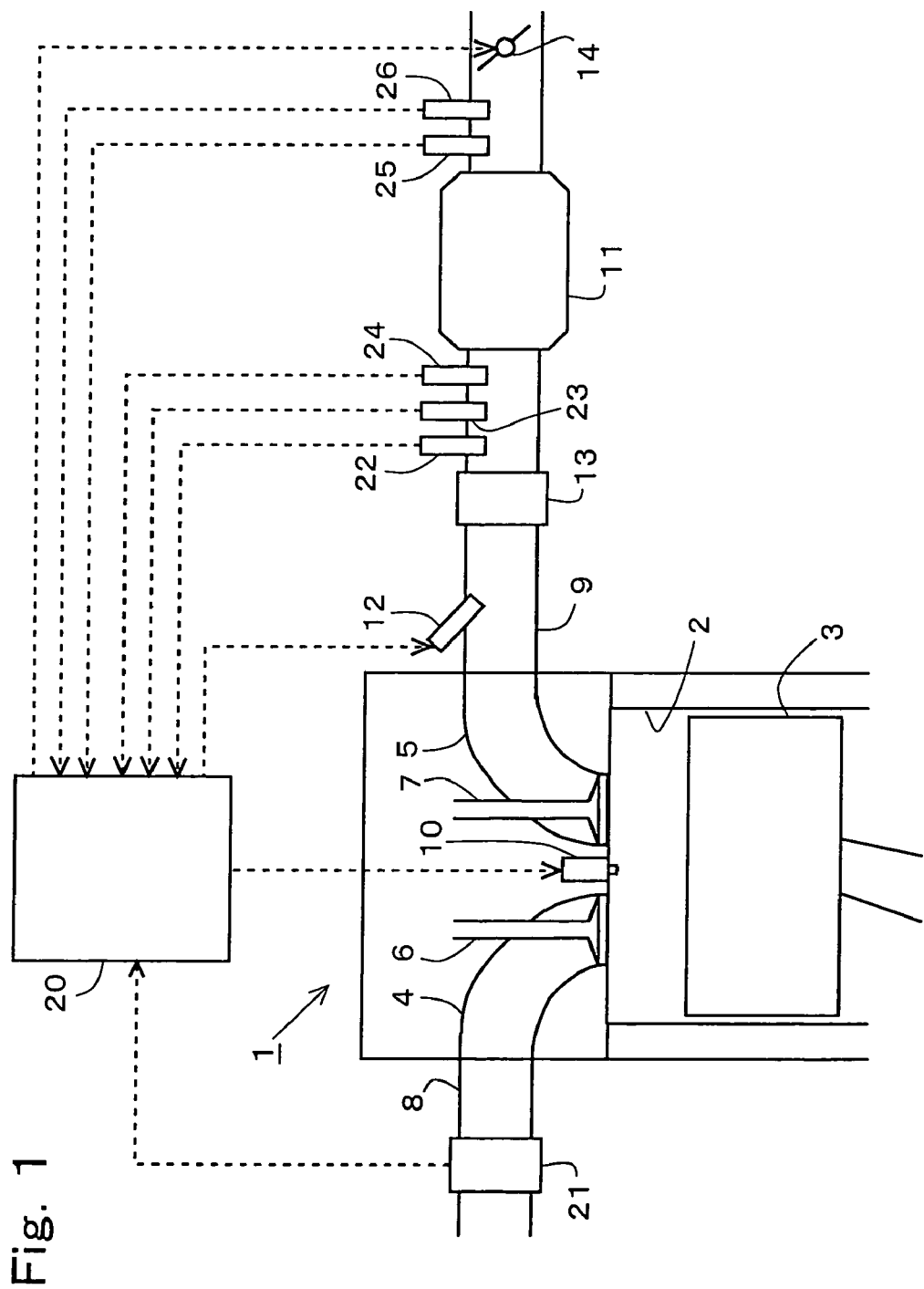
FIG. 1 illustrates the schematic construction of an internal combustion engine with its intake system and exhaust system according to an embodiment of the present invention.

Schematic Construction of an Internal Combustion Engine with its Intake and Exhaust Systems FIG. 1 illustrates the schematic construction of an internal combustion engine with its intake system and exhaust system according to an embodiment of the present invention.

The internal combustion engine 1 is a diesel engine having four cylinders 2 for driving a vehicle. A piston 3 is slidably fitted in each cylinder 2 of the internal combustion engine 1. An intake port 4 and an exhaust port 5 are connected with a combustion chamber defined in each cylinder 2 at an upper portion thereof. The intake port 4 and the exhaust port 5 have their opening portions into the combustion chamber adapted to be opened and closed by an intake valve 6 and an exhaust valve 7, respectively. The intake port 4 and the exhaust port 5 are connected with an intake passage 8 and an exhaust passage 9, respectively. In addition, on each cylinder 2, there is mounted a fuel injection valve 10 for directly injecting fuel into the cylinder 2.

On the intake passage 8, there is mounted an airflow meter 21 that serves to output an electric signal corresponding to an amount of intake air. A filter 11 is arranged on the exhaust passage 9, and an oxidation catalyst 13 is arranged on the exhaust passage 9 at a location upstream of the filter 11. A fuel addition valve 12 for adding a reducing agent in the form of fuel to an exhaust gas is arranged on the exhaust passage 9 at an upstream side of an oxidation catalyst 13. In addition, an exhaust gas throttle valve 14 for controlling the flow rate of the exhaust gas is arranged on the exhaust passage 9 at a downstream side of the filter 11.

On the exhaust passage 9 at locations downstream of the oxidation catalyst 13 and upstream of the filter 11, there are mounted an oxygen concentration sensor 22 that outputs an electric signal corresponding to the oxygen concentration of the exhaust gas, an upstream side exhaust gas temperature sensor 23 that outputs an electric signal corresponding to the temperature of the exhaust gas, and an upstream side exhaust pressure sensor 24 that outputs an electric signal corresponding to the pressure in the exhaust passage 9. Also, on the exhaust passage 9 at a location downstream of the filter 11 and upstream of the exhaust gas throttle valve 14, there are arranged a downstream side exhaust pressure sensor 25 that outputs an electric signal corresponding to the pressure in the exhaust passage 9, and a downstream side exhaust gas temperature sensor 26 that outputs an electric signal corresponding to the temperature of the exhaust gas.

An ECU 20 for controlling the internal combustion engine 1 is provided in conjunction with the internal combustion engine 1 as constructed in the above-described manner. Electrically connected to the ECU 20 are the various kinds of sensors such as the airflow meter 21, the oxygen concentration sensor 22, the upstream side exhaust gas temperature sensor 23, the upstream side exhaust pressure sensor 24, the downstream side exhaust pressure sensor 25, the downstream side exhaust gas temperature sensor 26, etc. Thus, the output signals of the various kinds of sensors are input to the ECU 20.

The ECU 20 estimates the temperature of the filter 11 based on the detected values of the upstream side exhaust gas temperature sensor 23 and the downstream side exhaust gas temperature sensor 26. Also, the ECU 20 estimates the amount of the PM deposited or accumulated in the filter 11 based on a difference between the detected value of the upstream side exhaust pressure sensor 24 and the detected value of the downstream side exhaust pressure sensor 25. In addition, the ECU 20 estimates a filter oxygen concentration, which is an oxygen concentration of an ambient atmosphere around the filter 11, based on the detected value of the oxygen concentration sensor 22. Here, in this embodiment, the upstream side exhaust pressure sensor 24 and the downstream side exhaust pressure sensor 25 are arranged on the exhaust passage 9 at the upstream side of the exhaust gas throttle valve 14, the output value of the upstream side exhaust pressure sensor 24 is used as an upstream side exhaust pressure.

In addition, the fuel injection valve 10, the fuel addition valve 12, and the exhaust gas throttle valve 14 are electrically connected to the ECU 20, and these valves are controlled by the ECU 20.

Filter Regeneration Control

Next, reference will be made to the filter regeneration control according to this embodiment. In this embodiment, in case where filter regeneration control is executed so as to oxidize and remove the PM deposited or accumulated in the filter 11, fuel is added from the fuel addition valve 12 to the exhaust gas when the oxidation catalyst 13 is in an active state.

When fuel is added from the fuel addition valve 12, the fuel is supplied to the oxidation catalyst 13, and the temperature of the incoming exhaust gas flowing into the filter 11 is raised by the oxidation heat generated by the oxidation of this fuel by the oxidation catalyst 13. The temperature of the filter 11 rises in accordance with the temperature rise of this incoming exhaust gas. At this time, the temperature of the filter 11 is controlled to a target temperature by controlling the amount of fuel to be added from the fuel addition valve 12. As a result, the PM deposited in the filter 11 is oxidized and removed.

Here, note that the target temperature is a temperature at which the PM deposited in the filter 11 can be removed by oxidation, and at which the filter 11 can be suppressed from excessively rising in temperature.

In addition, in the filter regeneration control, fuel may be supplied to the oxidation catalyst 13 by performing auxiliary fuel injection in the internal combustion engine 1 instead of the addition of fuel from the fuel addition valve 12.

Oxygen Concentration Decreasing Control

When the amount of intake air is decreased due to a change in the operating state of the internal combustion engine 1 during the above-mentioned filter regeneration control, the amount of incoming exhaust gas in the form of the flow rate of the exhaust gas flowing into the filter 11 also decreases, so the amount of heat being taken away will decrease. As a result, there is fear that the temperature of the filter might rise excessively.

Thus, according to this embodiment, when the amount of intake air in the internal combustion engine 1 decreases up to an amount at which an excessive rise in temperature of the filter 11 might be caused during the execution of filter regeneration control, oxygen concentration decreasing control is carried out in which the filter oxygen concentration is decreased up to a target oxygen concentration.

Figure 2:
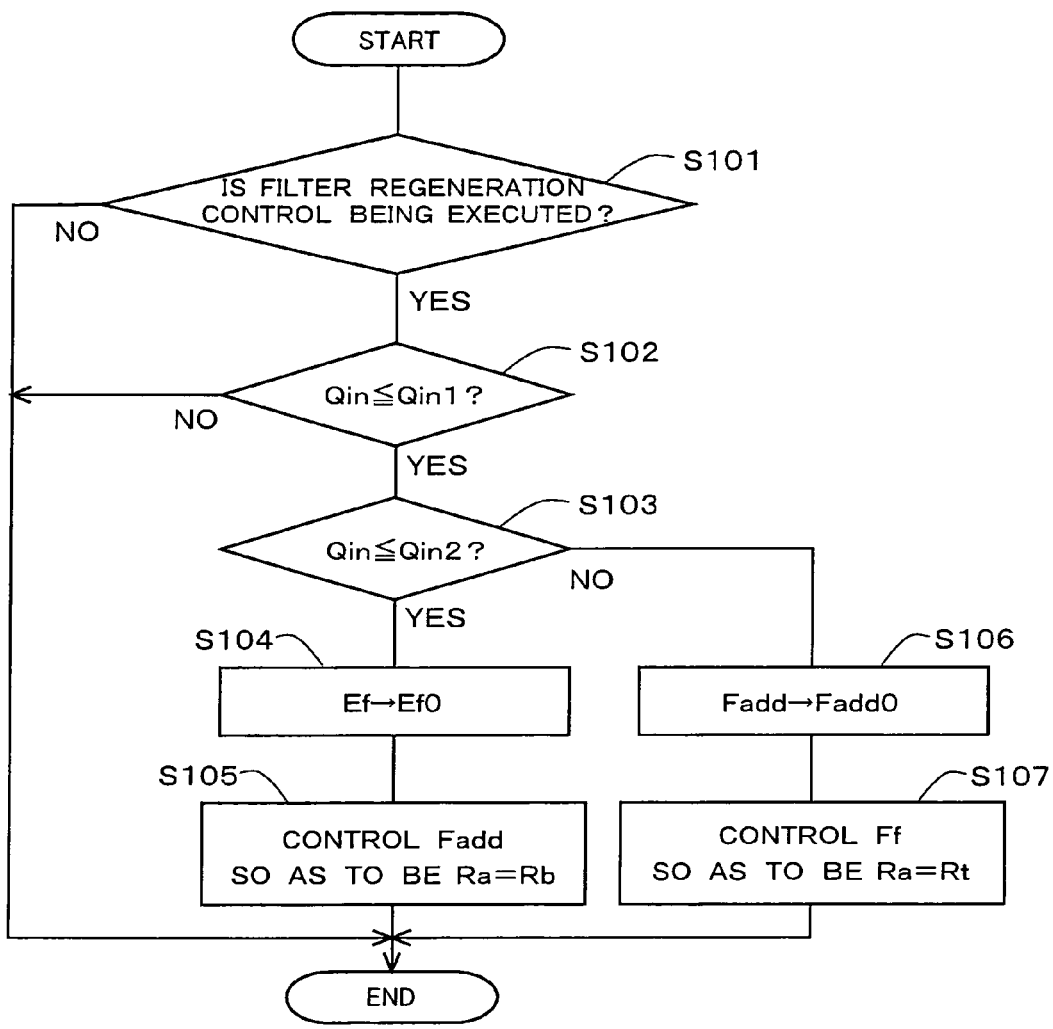
FIG. 2 is a flow chart illustrating a control routine for oxygen concentration decreasing control according to a first embodiment of the present invention.

Hereinafter, reference will be made to a control routine for oxygen concentration decreasing control according to this embodiment based on a flow chart shown in FIG. 2. This routine is a program beforehand stored in the ECU 20, and is executed at each specified time interval during the operation of the internal combustion engine 1.

In this routine, first in S101, the ECU 20 determines whether filter regeneration control is being executed. When a positive determination is made in S101, the ECU 10 advances to S102, whereas when a negative determination is made, the ECU 10 once terminates the execution of this routine.

In S102, the ECU 20 determines whether the amount of intake air Qin is less than or equal to a first specified amount of intake air Qin1.

Here, note that the first specified amount of intake air Qin1 is an amount in the form of a threshold with which it can be determined that the filter 11 excessively rises in temperature because of a decrease in the amount of heat taken away according to a decrease in the amount of incoming exhaust gas when the amount of intake air becomes equal to the first specified amount of intake air Qin1. This first specified amount of intake air Qin1 is decided by the ECU 20 based on the temperature of the filter 11 at the current point in time and the amount of PM in the filter 11 at the current point in time; etc. On the other hand, when a positive determination is made in S102, the ECU 10 advances to S103, whereas a negative determination is made, the ECU 10 once terminates the execution of this routine.

In S103, the ECU 20 determines whether the amount of intake air Qin is less than or equal to a second specified amount of intake air Qin2. Here, the second specified amount of intake air Qin2 is an amount that is smaller than the first specified amount of intake air Qin1. Here, this second specified amount of intake air Qin2 is an amount in the form of a threshold with which when the filter oxygen concentration Ra is lowered to a target oxygen concentration Rt, a determination can be made that exhaust gas throttling by the exhaust gas throttle valve 14 should be effected preferentially rather than the addition of fuel from the fuel addition valve 12. This second specified intake air amount Qin2 is a value which has been determined in advance through experiments, etc. When a positive determination is made in S102, the ECU 10 advances to step S104, whereas when a negative determination is made, the ECU 10 advances to S106.

The ECU 10, having advanced to S106, controls the amount of fuel Fadd to be added from the fuel addition valve 12 to an upper limit amount of addition Fadd0 which can be added within a range in which the temperature of the filter 11 does not exceed a specified temperature. Here, note that the specified temperature is a temperature lower than or equal to an upper limit value of a temperature at which an excessive rise in temperature of the filter 11 can be suppressed even when the filter oxygen concentration Ra rises due to the amount of intake air Qin exceeding the first specified amount of intake air Qin1. This specified temperature can be determined in advance through experiments, etc (e.g., 600 degrees C.).

According to this S106, an increased amount of fuel will be supplied as much as possible to the oxidation catalyst 13 within a range in which the excessive temperature rise of the filter 11 can be suppressed, whereby the filter oxygen concentration Ra is lowered.

Then, the ECU 20 advances to S107 where the flow rate of the exhaust gas is controlled by the exhaust gas throttle valve 14 in such a manner that the filter oxygen concentration Ra after the amount of fuel Fadd to be added from the fuel addition valve 12 has been controlled to the upper limit amount of addition Fadd0 can be further lowered to the target oxygen concentration Rt. That is, the flow rate of the exhaust gas is controlled by means of the exhaust gas throttle valve 14 by an amount that is necessary to further lower the filter oxygen concentration Ra after the amount of fuel Fadd to be added from the fuel addition valve 12 has been controlled to the upper limit amount of addition Fadd0 to the target oxygen concentration Rt. Thereafter, the ECU 20 once terminates the execution of this routine.

On the other hand, the ECU 10, having advanced to S104, throttles, by means of the exhaust gas throttle valve 14, the flow rate Ef of the exhaust gas to a lower limit flow rate Ef0, which can be throttled within a range where the upstream side exhaust pressure does not exceed a specified pressure.

Here, note that the specified pressure is lower than a pressure that becomes a threshold with which it can be determined that the upstream side exhaust pressure has excessively risen, and it is a value which has been determined in advance through experiments, etc. In addition, in this embodiment, the relation between the flow rate of the exhaust gas and the degree of opening of the exhaust gas throttle valve 14 is stored beforehand in the ECU 20 as a map. In step S104, the ECU 20 controls the degree of opening of the exhaust gas throttle valve 14 based on this map so as to adjust the flow rate Ef of the exhaust gas to the lower limit flow rate EF0. Here, note that the flow rate of the exhaust gas when the exhaust gas throttle valve 14 is closed to a minimum degree of opening becomes a lower limit value of the lower limit flow rate Ef0.

Then, the ECU 20 advances to S105 where the amount of fuel Fadd to be added by the fuel addition valve 12 is controlled in such a manner that the filter oxygen concentration Ra after the flow rate Ef of the exhaust gas has been controlled to the lower limit flow rate Ef0 can be further lowered to the target oxygen concentration Rt. In other words, an amount of fuel, which is necessary to further lower the filter oxygen concentration Ra after the flow rate Ef of the exhaust gas has been controlled to the lower limit flow rate Ef0 to the target oxygen concentration Rt, is added by the fuel addition valve 12. Thereafter, the ECU 20 once terminates the execution of this routine.

According to the routine as described above, in case where filter regeneration control is executed, when the amount of intake air decreases to the first specified amount of intake air Qin1 or below, the filter oxygen concentration Ra can be lowered to the target oxygen concentration Rt.

Also, when the amount of intake air decreases to a value within a range that is less than or equal to the first specified amount of intake air Qin1 and greater than the second specified amount of intake air Qin2, i.e., when the flow rate of the exhaust gas upon the decrease of the amount of intake air is relatively large, the filter oxygen concentration Ra is lowered by performing the addition of fuel from the fuel addition valve 12 preferentially rather than the exhaust gas throttling by the exhaust gas throttle valve 14. Accordingly, the filter oxygen concentration Ra can be lowered up to the target oxygen concentration Rt while suppressing the amount of throttling of the flow rate of the exhaust gas by the exhaust gas throttling as much as possible. As a result, it is possible to suppress an excessive rise in temperature of the filter 11 while suppressing an excessive rise in the upstream side exhaust pressure.

In addition, when the amount of intake air decreases to the second specified amount of intake air Qin2 or below, i.e., when the flow rate of the exhaust gas upon the decrease of the amount of intake air is relatively small, the filter oxygen concentration Ra is lowered by performing exhaust gas throttling by the exhaust gas throttle valve 14 preferentially rather than the addition of fuel from the fuel addition valve 12. Accordingly, the filter oxygen concentration Ra can be lowered up to the target oxygen concentration Rt while suppressing the amount of fuel supplied to the oxidation catalyst 13 as much as possible. Thus, the amount of oxidation heat generated by oxidation of the fuel can be suppressed by suppressing the amount of the fuel to be supplied to the oxidation catalyst 13. As a result, the excessive rise in temperature of the filter 11 can be further suppressed.

Also, when the exhaust gas throttling by the exhaust gas throttle valve 14 is performed preferentially rather than the addition of fuel from the fuel addition valve 12 upon lowering the filter oxygen concentration Ra, it is possible to lower the filter oxygen concentration Ra to the target oxygen concentration Rt more quickly. In this case, the amount of oxygen supplied to the filter 11 can also be decreased.

Thus, according to this embodiment, it is possible to suppress the excessive rise in temperature of the filter during the execution of filter regeneration control more preferably.

Second Embodiment

The overall construction of an internal combustion engine and its intake and exhaust systems according to this embodiment is similar to the above-mentioned first embodiment and hence an explanation thereof is omitted.

In addition, in this embodiment, too, filter regeneration control and oxygen concentration decreasing control similar to those in the first embodiment are carried out.

Exhaust Gas Throttling Release Control

Figure 3:
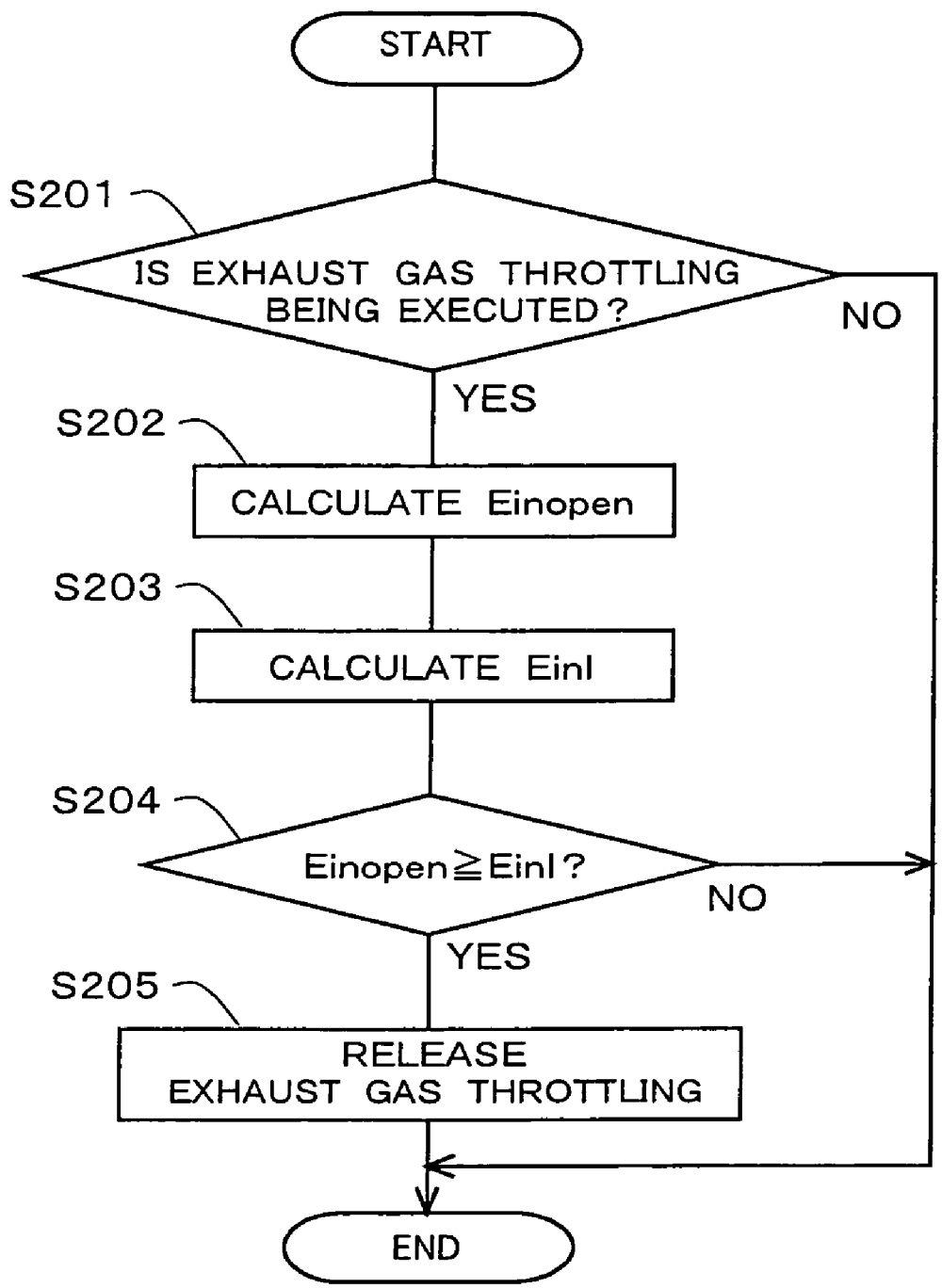
FIG. 3 is a flow chart illustrating a control routine for exhaust gas throttling release control according to a second embodiment of the present invention.

Here, reference will be made, based on FIG. 3, to the exhaust gas throttling release control for releasing exhaust gas throttling that is performed by the exhaust gas throttle valve so as to lower the filter oxygen concentration under oxygen concentration decreasing control. FIG. 3 is a flow chart illustrating a control routine for exhaust gas throttling release control according to this embodiment. This routine is a program beforehand stored in the ECU 20, and is executed at each specified time interval during the operation of the internal combustion engine 1.

In this routine, first in S201, the ECU 20 determines whether exhaust gas throttling by the exhaust gas throttling valve 14 is being executed. When a positive determination is made in step S201, the ECU 20 advances to S202, whereas when a negative determination is made, the ECU 20 once terminates the execution of this routine.

In S202, the ECU 20 calculates an amount of incoming exhaust gas Einopen after release of exhaust gas throttling, which is an amount of incoming exhaust gas when exhaust gas throttling is released, based on the amount of intake air in the internal combustion engine 1 at the current point in time. If the operating state of the internal combustion engine 1 is changed to increase the amount of incoming exhaust gas during the execution of oxygen concentration decreasing control, the amount of incoming exhaust gas Einopen after release of exhaust gas throttling increases, too.

Then, the ECU 20 advances to S203 where it calculates an excessive temperature rise suppressible flow rate Ein1 that is a lower limit value of the amount of incoming exhaust gas at which the amount of heat being taken away becomes more than the amount of heat generated by the oxidation of the PM. This excessive temperature rise suppressible flow rate Ein1 can be calculated based on the current temperature of the filter 11 and the current amount of the deposited or accumulated PM in the filter 11.

Subsequently, the ECU 10 advances to S204 where it determines whether the amount of incoming exhaust gas Einopen after release of exhaust gas throttling is more than or equal to the excessive temperature rise suppressible flow rate Ein1. When a positive determination is made in step S204, the ECU 20 advances to S205, whereas when a negative determination is made, the ECU 20 once terminates the execution of this routine.

The ECU 20, having advanced to S205, releases the exhaust gas throttling by the exhaust gas throttle valve 14, and thereafter, once terminates the execution of this routine.

When the amount of intake air is increased due to a change in the operating state of the internal combustion engine during the execution of oxygen concentration decreasing control thereby to increase the amount of incoming exhaust gas Einopen after release of exhaust gas throttling, the amount of heat being taken away will increase, too. However, at this time, when the exhaust gas throttling by the exhaust gas throttle valve 14 is released, the filter oxygen concentration also rises rapidly, so the amount of oxidation heat generated by the oxidation of the PM might increase rapidly, too. Therefore, there is fear that an excessive temperature rise of the filter 11 might be induced if the exhaust gas throttling by the exhaust gas throttle valve 14 is released at timing at which the amount of oxidation heat generated by the oxidation of the PM becomes more than the amount of heat being taken away.

According to the above-mentioned control routine, however, the exhaust gas throttling by the exhaust gas throttle valve 14 is released when the amount of incoming exhaust gas Einopen after release of exhaust gas throttling has increased to the excessive temperature rise suppressible flow rate Ein1 in accordance with the increasing amount of intake air.

Thus, according to this embodiment, it is possible to release the exhaust gas throttling by the exhaust gas throttle valve 14 at timing at which the excessive temperature rise of the filter can be suppressed.

INDUSTRIAL APPLICABILITY

According to the present invention, in an exhaust gas purification system for an internal combustion engine which is provided with a particulate filter arranged on an exhaust passage of the internal combustion engine for trapping particulate matter in an exhaust gas, it is possible to suppress an excessive rise in temperature of the filter during the execution of filter regeneration control more preferably.

The invention claimed is:

1. An exhaust gas purification system for an internal combustion engine characterized by comprising:
   a particulate filter that is arranged on an exhaust passage of said internal combustion engine for trapping particulate matter in an exhaust gas;
   a catalyst having an oxidation function that is arranged on said exhaust passage at a location upstream of said particulate filter or supported on said particulate filter;
   a reducing agent supplying means for supplying a reducing agent to said catalyst;
   an exhaust gas throttle valve that is arranged on said exhaust passage;
   a filter regeneration control execution means that executes filter regeneration control for oxidizing and removing said particulate matter deposited in said particulate filter by raising the temperature of said particulate filter to a target temperature; and
   an oxygen concentration decreasing means that decreases the oxygen concentration of an ambient atmosphere around said particulate filter;
   wherein when the amount of intake air in said internal combustion engine decreases to a value within a range that is less than or equal to a first specified amount of intake air and greater than a second specified amount of intake air at the time of the execution of filter regeneration control by said filter regeneration control execution means, said oxygen concentration decreasing means decreases the oxygen concentration of the ambient atmosphere around said particulate filter to a target oxygen concentration by supplying an upper limit amount of reducing agent, which can be supplied within a range where the temperature of said particulate filter does not exceed a specified temperature, to said catalyst by said reducing agent supply means, and at the same time by throttling the flow rate of the exhaust gas by means of said exhaust gas throttle valve;

whereas when the amount of intake air in said internal combustion engine decreases to a value less than or equal to said second specified amount of intake air during the execution of filter regeneration control by said filter regeneration control execution means, said oxygen concentration decreasing means decreases the oxygen concentration of the ambient atmosphere around said particulate filter to said target oxygen concentration by throttling the flow rate of the exhaust gas to a lower limit of the flow rate, which can be throttled within a range where pressure in said exhaust passage upstream of said exhaust gas throttle valve does not exceed a specified pressure, by means of said exhaust gas throttle valve, and at the same time by supplying the reducing agent to said catalyst by means of said reducing agent supply means.

2. The exhaust gas purification system for an internal combustion engine as set forth in claim 1, further characterized by comprising:

a prediction means that predicts, based on the amount of intake air in said internal combustion engine, a flow rate of the exhaust gas flowing into said particulate filter upon release of the exhaust gas throttling by said exhaust gas throttle valve during the time when exhaust gas throttling is carried out by said exhaust gas throttle valve;

wherein when the flow rate of the exhaust gas predicted by said prediction means increases up to an excessive temperature rise suppressible flow rate which can suppress an excessive temperature rise of said particulate filter, the exhaust gas throttling by said exhaust gas throttle valve is released.

* * * * *